(12) United States Patent
Barkelew et al.

(10) Patent No.: US 9,483,381 B2
(45) Date of Patent: Nov. 1, 2016

(54) OBFUSCATING DEBUGGING FILENAMES

(71) Applicant: Dell Products L.P., Round Rock, TX (US)

(72) Inventors: Jonathan Bret Barkelew, Austin, TX (US); Ricardo L. Martinez, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 39 days.

(21) Appl. No.: 14/570,998

(22) Filed: Dec. 15, 2014

(65) Prior Publication Data
US 2016/0170862 A1 Jun. 16, 2016

(51) Int. Cl.
*G06F 9/44* (2006.01)
*G06F 11/36* (2006.01)
*G06F 9/45* (2006.01)
*G06F 17/30* (2006.01)

(52) U.S. Cl.
CPC ............ *G06F 11/3624* (2013.01); *G06F 8/41* (2013.01); *G06F 17/30123* (2013.01)

(58) Field of Classification Search
None
See application file for complete search history.

(56) References Cited

U.S. PATENT DOCUMENTS

| | | | | |
|---|---|---|---|---|
| 6,862,683 B1 * | 3/2005 | Wille | ...................... | G06F 21/14 713/151 |
| 7,930,743 B2 * | 4/2011 | Saito | ...................... | G06F 21/54 380/251 |
| 8,225,290 B2 * | 7/2012 | Pensak | .................. | G06F 21/126 712/227 |
| 9,223,554 B1 * | 12/2015 | Lawson | ...................... | G06F 8/54 |
| 2003/0093685 A1 * | 5/2003 | Tobin | ...................... | G06F 21/126 713/190 |
| 2003/0191938 A1 * | 10/2003 | Woods | ................ | G06F 21/6209 713/165 |
| 2003/0217255 A1 * | 11/2003 | Wyatt | ................... | G06F 9/4411 713/100 |
| 2004/0003264 A1 * | 1/2004 | Zeman | ..................... | G06F 21/14 713/190 |
| 2005/0278535 A1 * | 12/2005 | Fortune | ..................... | G06F 8/61 713/176 |
| 2007/0101115 A1 * | 5/2007 | Murakami | ................ | G06F 8/65 713/1 |

(Continued)

FOREIGN PATENT DOCUMENTS

EP 1942431 A1 * 7/2008 ............. G06F 21/64

OTHER PUBLICATIONS

NPL-Barr—Compiler PDB and Linker PDB-2010, Located at http://stackoverflow.com/questions/3796090/compiler-pdb-file-and-the-linker-pdb-file.*

(Continued)

*Primary Examiner* — Wei Zhen
*Assistant Examiner* — Hossain Morshed
(74) *Attorney, Agent, or Firm* — Campbell Stephenson LLP; Shiv S. Naimpally

(57) ABSTRACT

An information handling system, method, and computer-readable media for obfuscating debugging filenames during a software build are described. The system comprises one or more processors, a memory, and one or more program modules stored on the memory and executable by the one or more processors. The one or more program modules compile a source code file of a plurality of source code files into a program, generate a debugging file including debugging information for the program, utilize a one-way deterministic function to generate an obfuscated filename for the debugging file, and include a link to the debugging file in the program, the link including the obfuscated filename.

20 Claims, 5 Drawing Sheets

(56) References Cited

U.S. PATENT DOCUMENTS

| | | | | |
|---|---|---|---|---|
| 2008/0118150 | A1* | 5/2008 | Balakrishnan | G06F 17/2276 382/176 |
| 2009/0222561 | A1* | 9/2009 | George | H04L 12/5691 709/226 |
| 2009/0235089 | A1* | 9/2009 | Ciet | G06F 21/577 713/190 |
| 2009/0235091 | A1* | 9/2009 | Kurn | H04L 9/3236 713/193 |
| 2011/0004771 | A1* | 1/2011 | Matsushima | G06F 21/554 713/189 |
| 2011/0035414 | A1* | 2/2011 | Barton | G06Q 30/02 707/802 |
| 2014/0032932 | A1* | 1/2014 | Hiar | G06F 11/366 713/190 |
| 2014/0089651 | A1* | 3/2014 | Yao | H04L 9/3247 713/2 |
| 2014/0164774 | A1* | 6/2014 | Nord | G06F 21/602 713/171 |
| 2014/0268229 | A1* | 9/2014 | Kempka | G06F 9/4413 358/1.15 |

OTHER PUBLICATIONS

NPL-MSDN1—Linker Options—Visual Studio 2013, Located at: https://msdn.microsoft.com/en-us/library/y0zzbyt4(v=vs.120).aspx.*

NPL-MSDN2—LINK input files—Visual Studio 2013, Located at: https://msdn.microsoft.com/en-us/library/hcce369f(v=vs.120).aspx.*

NPL—Stellarium—CompileWithVisualCpp—2014, Located at: http://stellarium.org/wiki/index.php/CompileWithVisualCpp.*

NPL—Wroblewski—Program Code Obfuscation—2002, Located at: http://citeseerx.ist.psu.edu/viewdoc/download?doi=10.1.1.19.9052&rep=rep1&type=pdf.*

NPL-MSDN1—Linker Options—Visual Studio 2013, Microsoft Located at https://msdn.microsoft.com/en-us/library/y0zzbyt4(v=vs.120).aspx.*

NPL-MSDN2—Link Input files—Visual Studio 2013, Microsoft Liocated at https://msdn.microsoft.com/en-us/library/hcce369f(v=vs.120).aspx.*

Microsoft, "DEBUG (Generate Debug Info)", retreived on Nov. 4, 2014 from <<http://msdn.microsoft.com/en-us/library/xe4t6fc1.aspx>>, 1 page.

* cited by examiner

```
offset(h)  00 01 02 03 04 05 06 07 08 09 0A 0B 0C 0D 0E 0F 00000630                           3B 1F 37 AC 03 00 00 00  32 66 64 34 65 31 63 36    ;.7¬....2fd4e1c6
00000640   37 61 32 64 32 38 66 63 65 64 38 34 39 65 65 31                             7a2d28fced849ee1
00000650   62 62 37 36 65 37 33 39 31 62 39 33 65 62 31 32                             bb76e7391b93eb12
00000660   2E 70 64 62 00 53 56 8B 8B 74 24 10 57 8B 7C 24 10                          .pdb.SV‹t$.W‹|$.
```

```
offset(h)  00 01 02 03 04 05 06 07 08 09 0A 0B 0C 0D 0E 0F

00000630   E1 A7 BC 33 03 00 00 00 43 3A 5C 44 45 4C 4C 5F    á§¼3....C:\DELL_
00000640   44 45 42 55 47 5C 32 66 64 34 65 31 63 36 37 61    DEBUG\2fd4e1c67a
00000650   32 64 32 38 66 63 65 64 38 34 39 65 65 31 62 62    2d28fced849ee1bb
00000660   37 36 65 37 33 39 31 62 39 33 65 62 31 32 2E 70    76e7391b93eb12.p
00000670   64 62 00 53 56 8B 74 24 10 57 8B 7C 24 10 E8 1A    db.SV‹t$.W‹|$.è.
```

FIG. 3

OBFUSCATING DEBUGGING FILENAMES

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One subsystem of an information handling system is a Basic Input/Output System (BIOS), which is often the first application executed by an information handling system upon start-up. Among other things, the BIOS loads a bootloader and an operating system during startup and is often responsible for critical functions of the information handling system. The BIOS is often constructed from multiple executable images, each having specific functionality. If a hacker or other bad actor were to determine the general functionality of a particular section of the BOIS binary code, the hacker might more easily reverse-engineer the code to expose an attack surface or reveal a vulnerability of the BIOS.

SUMMARY

In some embodiments, an information handling system for obfuscating debugging filenames during a software build is described. The system comprises one or more processors, a memory, and one or more program modules stored on the memory and executable by the one or more processors. The one or more program modules compile a source code file or a plurality of source code files into a program, generate a debugging file including debugging information for the program, utilize a one-way deterministic function to generate an obfuscated filename for the debugging file, and include a link to the debugging file in the program, the link including the obfuscated filename.

In some embodiments, a method for obfuscating debugging filenames during a software build is described. The method comprises compiling a source code file or a plurality of source code files into a program, where the program is included in a Basic Input/Output System (BIOS) file. The method also includes generating a debugging file including debugging information for the program, utilizing a one-way deterministic function to generate an obfuscated filename for the debugging file, and including a link to the debugging file in the program, where the link includes the obfuscated filename.

In some embodiments, one or more non-transitory computer-readable media storing programming instructions that are executable by one or more processors of a computing device to perform acts are described. The acts comprise compiling a source code file or a plurality of source code files into a program, where the program is included in a Basic Input/Output System (BIOS) file, generating a debugging file including debugging information for the program, utilizing a one-way deterministic function to generate an obfuscated filename for the debugging file, and including a link to the debugging file in the program, where the link includes the obfuscated filename.

BRIEF DESCRIPTION OF THE DRAWINGS

A more complete understanding of the present disclosure may be obtained by reference to the following Detailed Description when taken in conjunction with the accompanying Drawings.

FIG. 2 illustrates a section of binary code from a BIOS image that reveals an obfuscated filename.

FIG. 3 illustrates a section of binary code from a BIOS image that reveals an obfuscated filename and a directory path.

DETAILED DESCRIPTION

Figure 1:
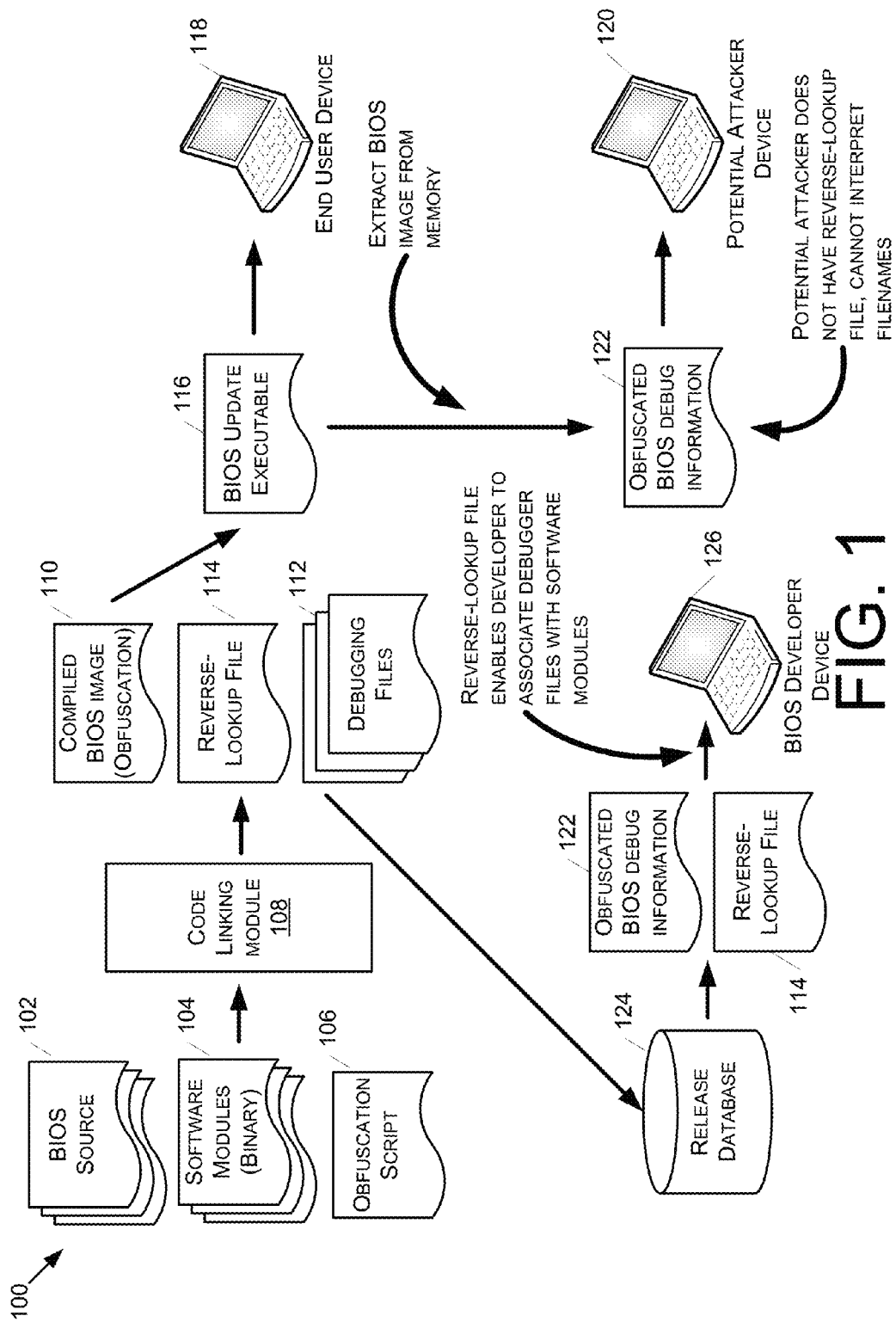
FIG. 1 illustrates an environment in which obfuscated debugging filenames are generated and utilized.

As noted above, a BIOS image may be built from a collection of executables, each linked together to form the BIOS image. To facilitate debugging, either during development of the BIOS or during subsequent testing of a BIOS image that has been released to an end-user device, debugging information may be generated during the software build process and stored in a debugging file. One example of a debugging file is a program database (PDB) file. In order for the debugging file to be usable during the debugging process, links to the appropriate debugging file are included in the compiled BIOS image. A linker generates the debugging information, stores the debugging information in a debugging file, and inserts a link to the debugging file (e.g., a filename or a directory path and filename) within the compiled code. The debugging file may take the name of the binary file to which it corresponds. For example, PDB file foo.pdb may be associated with foo.exe or foo.dll.

For monolithic executables, a single master debugging file is generated, and a link to the master debugging file is added to the binary image of the executable. Other binary files, such as BIOS images, are often collections of independent executable images, and may therefore contain multiple links to debugging files. It is often the custom of software developers to name these independent executable images using a description that calls to mind their function. For example, a potential attacker doing a word search for "password" may find a link in the binary code to "password.pdb" thereby locating a section of the BIOS image associated with a password driver. Similarly, a potential hacker performing a word search for "TPM" or "HDD" may be able to locate the section of the BIOS binary code associated with a Trusted Platform Module (TPM) or Hard Disk Drive (HDD), respectively.

Also, the file path included in the debugging file links may reveal information about the system in which the software is built, including, for example, the software running on the build system, names of servers on the build system, and other information. Any or all of this information may provide nefarious actors with enough information to enable them to reverse-engineer the associated binary code and expose an attack surface or vulnerability within the software image, or seek out attack vulnerabilities within the build system network. In this way, the links to the debugging files can be thought of as an index of sorts for potential attackers to look for vulnerabilities.

Embodiments of the present disclosure describe methods for obfuscating the links to debugging information in the software image, such that the underlying names and pathnames of the executables are not apparent from the links. Further details of the present disclosure will be apparent from the following description of the figures and associated embodiments. Although embodiments described herein refer to BIOS images and their associated debugging files, embodiments are not limited to BIOS images, and are generally applicable to any type of software (e.g., firmware, operating system software, applications, or the like) being compiled with debugging file links included therein.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 illustrates an environment 100 in which obfuscated debugging filenames are generated and utilized. BIOS source code files 102 are compiled to generate software modules (binary files) 104. The software modules 104 have filenames that, as discussed above, may be descriptive of their function. An obfuscation script 106 is executed, prior to running a code linking module 108, to generate obfuscated filenames for debugging files that will be generated later. All arguments that would normally be passed to the code linking module 108 are instead first passed to the obfuscation script 106.

The obfuscation script 106 performs pre-processing to generate obfuscated filenames, runs the code linking module 108, and performs post-processing. In pre-processing, the obfuscation script 106 utilizes a one-way deterministic function to generate the obfuscated filename. A one-way function is a function that cannot be reversed to determine the inputs used to generate known outputs. A deterministic function is one that generates the same outputs every time the same inputs are used. Hash functions are examples of one-way deterministic functions. Thus, the obfuscated filename is able to be regenerated from the same inputs each time, but the obfuscated filename cannot be used to determine the original inputs. In embodiments, the inputs to the one-way deterministic function employed by the obfuscation script 106 are the filenames of the software modules 104.

The obfuscation script 106 runs the code linking module 108. The code linking module 108 includes some functionality, in some embodiments, that enables the obfuscation script 106 to pass along the obfuscated filenames as arguments to the code linking module 108. The code linking module 108 builds a compiled BIOS image 110 from the software modules 104. The compiled BIOS image 110 includes links to debugging files 112 having obfuscated names. The code linking module 108 also generates the debugging files 112 using the obfuscated names determined and passed to it by the obfuscation script 106.

In post-processing (after the code linking module 108 completes) the obfuscation script 106 copies the debugging files 112 from a build output directory to a common directory for debugging files. A reverse-lookup file 114 is also generated by the obfuscation script 106. The reverse-lookup file 114 maps the names of the software modules 104 with the obfuscated names of their corresponding debugging files 112.

The compiled BIOS image 110 is packaged as a BIOS update executable 116 and provided to end user devices, such as via a web download or in some other way. The compiled BIOS image 110 may also, in some embodiments, be installed directly on the end user devices 118, such as during production of the end user device 118.

A potential attacker, hacker, or other bad actor may obtain the compiled BIOS image 110, such as by downloading and installing the BIOS update executable 116 and extracting the BIOS image from memory. Once the compiled BIOS image 110 is extracted from memory on a potential attacker device 120, the potential attacker is able to view the binary code and can perform an ASCII search on the binary code. The compiled BIOS image 110 includes, as discussed above, the links to the debugging files. In a conventional arrangement, where the debugging files take their names from the binary software modules 104, the links to the debugging files in the BIOS image would reveal the names of the binary software modules 104 that correspond to the debugging files. However, the BIOS image 110 from memory includes obfuscated BIOS debug information 122, which reveals obfuscated debugging filenames. Because the potential attacker does not have the reverse-lookup file 114, the potential attacker cannot make use of the obfuscated filenames revealed in the BIOS image to seek out potential attack surfaces, or vulnerabilities, or locations in the BIOS image from which data can be extracted or from which the BIOS could be made to perform unauthorized or unintended functions.

Upon creation of the debugging files 112 and the reverse-lookup file 114, the obfuscation script 106 stores (or causes storage of) the debugging files 112 and the reverse-lookup file 114 in a release database 124. During debugging of the BIOS image 110, the obfuscated BIOS debug information 122 and the reverse-lookup file 114 are integrated to provide the appropriate debugging information, including information about which software modules 104 correspond to which debugging files 112, to the BIOS developer device 126.

The obfuscation script 106 in some embodiments adds a fixed directory path to the filename link in the BIOS image 110, so that information regarding the build system cannot be determined from the directory pathname.

In some embodiments, in addition to utilizing the names of the binary software modules 104 as inputs to the one-way deterministic function, the obfuscation script 106 also utilizes a cryptographic salt as an input. Adding a cryptographic salt further obfuscates the debugging filenames. A cryptographic salt may be a project name, code name, version number, computer platform name or other non-random and reproducible data related to the software build process. Adding the cryptographic salt makes it difficult for an attacker that has figured out what process that an obfuscated debugging filename corresponds to in a first BIOS image, to use this information to locate the same section of code within a second BIOS image. Because the obfuscation script 106 utilizes a deterministic function, the same filename input for the software modules 104 results in the same obfuscated filenames for the debugging files each time. If developers utilize the same filenames for each BIOS image they write, then the obfuscated filenames will also carry forward to each BIOS image. A cryptographic salt that is different for two different BIOS images will result in different obfuscated filenames, even if the software modules 104 have the same filenames in both BIOS images.

FIG. 2 illustrates a section 200 of binary code from a BIOS image that reveals an obfuscated filename. Binary code portion 202 corresponds to ASCII text 204, which reveals the obfuscated filename 2fd4e1c67a2d28fced849ee1bb76e7391b93eb12.pdb. If the non-obfuscated (i.e., original filename) of the debugging file is UserPasswordManager.pdb, the non-obfuscated filename (if it were present in the section 200 of the BIOS image) would reveal the location of the password driver. Obfuscating the filename as illustrated in FIG. 2 eliminates this information from the binary code, making it difficult for an attacker to identify the binary code.

FIG. 3 illustrates a section 300 of binary code from a BIOS image that reveals an obfuscated filename and a directory path. Binary code portion 302 corresponds to ASCII text 304, which reveals the obfuscated filename and pathname C:\DELL_DEBUG\2fd4e1c67a2d28fced849-ee1bb76e7391b93eb12.pdb. This fixed pathname is generic and reveals no information regarding the build system that could be used to infiltrate or attack the system.

Figure 4:
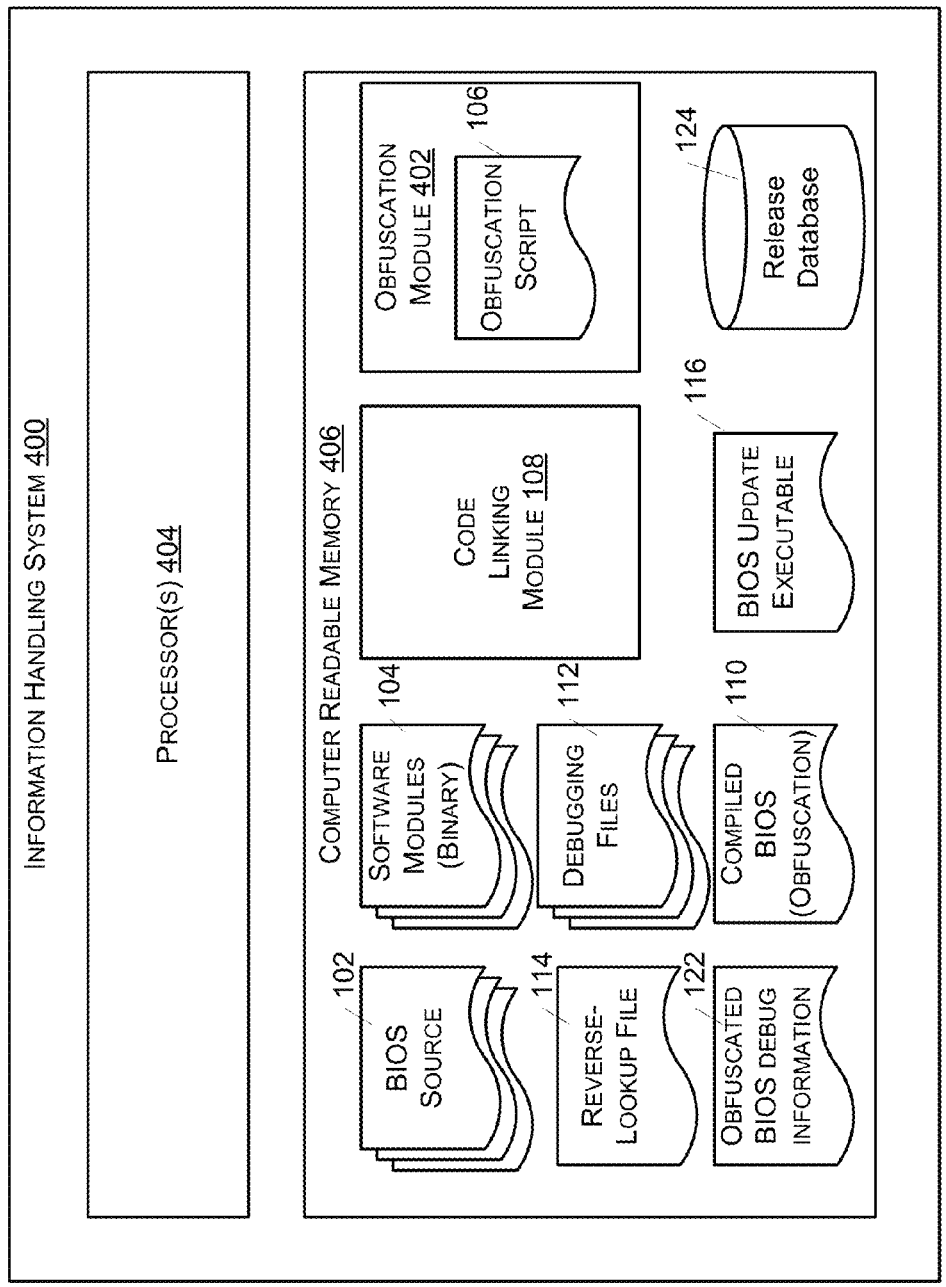
FIG. 4 illustrates an information handling system configured to perform filename obfuscation.

FIG. 4 illustrates an information handling system 400 configured to perform filename obfuscation. The BIOS source files 102, binary software modules 104, obfuscation script 106, code linking module 108, compiled BIOS image 110, debugging files 112, reverse-lookup file 114, BIOS update executable 116, obfuscated BIOS debug information 122, and the release database 124 may be stored on computer-readable memory 406. The obfuscation script 106 is part of, or is run, by an obfuscation module 402 to perform the filename obfuscation as described herein. At least the code linking module 108 and the obfuscation module 402 are executable by one or more processors 404 to cause the information handling system 400 to perform the various methods described herein.

The one or more processors 404 may include a microprocessor, controller, programmable logic device, such as a Field Programmable Gate Array (FPGA), an application specific integrated circuit (ASIC), or other hardware resource operable to execute the obfuscation module 402. The one or more processors 404 may include one or more dual or multi-core processors.

Computer-readable memory 406 may include any form of volatile or non-volatile memory including magnetic media, optical media, random access memory (RAM) such as dynamic RAM (DRAM) static RAM (SRAM), or other. Forms of volatile or non-volatile memory also includes read-only memory (ROM), erasable/programmable memory, solid state memory such as flash memory, removable media, or any other suitable local or remote memory component or components.

In particular embodiments, computer-readable memory 406 may include random access memory (RAM). This RAM may be volatile memory. Computer-readable memory 406 may store any suitable data or information utilized by information handling system 400, including one or more software modules embedded in a computer-readable medium, and/or encoded logic incorporated in hardware. In particular embodiments, computer-readable memory 406 may include main memory for storing instructions for one or more processors 404 to execute or data for one or more processors 404 to operate on. In particular embodiments, one or more memory management units (MMUs) may reside between the one or more processors 404 and computer-readable memory 406 and facilitate accesses to computer-readable memory 406 requested by the one or more processors 404. As used herein, computer-readable memory 406 does not include purely transitory media, such as signals and communication media. As such, computer-readable memory 406 is a form of non-transitory computer-readable media. As used herein, non-transitory computer-readable media includes one or more of optical storage, magnetic storage, RAM, ROM, solid-state memory such as flash memory, a hard disk drive, a floppy drive, tape storage, a smart card, an integrated circuit, and so forth.

Software modules include one or more of applications, binary code, computer programs, executable files, computer-executable instructions, program modules, source code expressed in a high-level programming language such as C, C++, Perl, or other, code expressed in a low-level programming code such as machine code, etc. An example software module is a BIOS file. Other examples include an application programming interface (API), a dynamic-link library (DLL) file, an executable file, a firmware image, and so forth.

Figure 5:
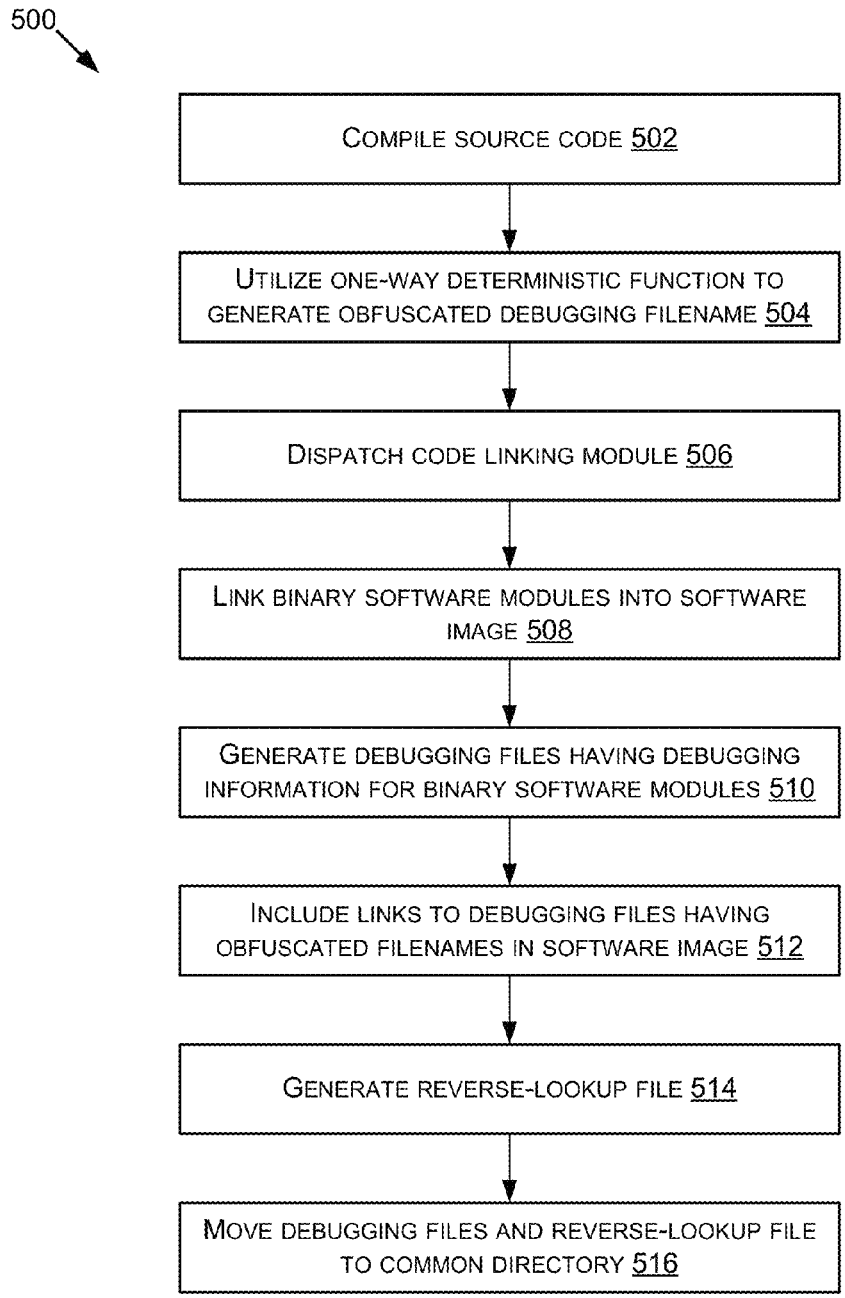
FIG. 5 illustrates a process for obfuscating debugging filenames.

FIG. 5 illustrates a process 500 for obfuscating debugging filenames. At 502, an information handling system, such as the information handling system 400, compiles a source code file or a plurality of source code files into a program. In embodiments, the program is one of a plurality of binary software modules that are to be linked together to form an executable BIOS image, although other types of programs are compiled without departing from the scope of embodiments.

At 504, an obfuscation module, such as the obfuscation module 402, runs an obfuscation script or other code that utilizes a one-way deterministic function to generate an obfuscated filename that will be used for naming a debugging file associated with the program. In embodiments, the one-way deterministic function is a hash function, such as secure hash algorithm 1 (SHA-1) function or other hash algorithm. In embodiments, the one-way deterministic function utilizes at least an original filename of the source code file or the program as an input into the one-way deterministic function to generate the obfuscated filename. In the same or different embodiments, the one-way deterministic function utilizes at least a cryptographic salt as an input into the one-way deterministic function to generate the obfuscated filename. In embodiments, the obfuscation module also determines a directory pathway for the link to the debugger file to be placed into the binary code of the compiled binary. The directory pathway is, in some embodiments, a common pathway for a plurality of debugging files. In embodiments, the obfuscation module determines the obfuscated filenames for the program files prior to running a linker.

At 506, the obfuscation module runs a linker, such as the code linking module 108, to link a plurality of compiled program binaries into a compiled executable, such as a compiled BIOS image. At 508, the linker links the plurality of compiled program binaries into the compiled executable.

At 510, the linker generates a debugging file that includes debugging information for the program, as well as debugging files for all of the programs that form the compiled executable. At 512, the linker includes a link to the debugging file in the program, the link including the obfuscated filename determined by the obfuscation module for the program. The link to the debugging file in the program also includes a directory pathway, where links for each of a plurality of debugging files for each of the source code files include the directory pathway.

At 514, the obfuscation module generates a reverse-lookup file that associates the obfuscated filename with an original filename of the source code file or the program. As noted above, the reverse-lookup file is not released with the compiled executable, but is instead kept in a secure location.

At 516, the obfuscation module moves the debugging files and the reverse-lookup file to a common directory.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. For example, the order in which the operations are performed may be changed without departing from the scope of the present invention Also, one or more of the described blocks may be omitted without departing from the scope of the present disclosure.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the scope of the present disclosure.

What is claimed is:

1. An information handling system for obfuscating debugging filenames during a software build, the information handling system comprising:
   one or more processors;
   a memory;
   one or more program modules stored on the memory and executable by the one or more processors to:
      compile a source code file or a plurality of source code files into software modules;
      pass file names of the software modules to a script;
      generate, at least in part by the script and based at least in part on a one-way deterministic function, obfuscated filenames for the filenames of the software modules;
      pass the obfuscated filenames as arguments to a linker module; and
      generate, by the linker module, a software image file to include links to debugging files, the links including the obfuscated filenames.

2. The information handling system of claim 1, wherein the one-way deterministic function utilizes at least an original filename of the source code file or the program as an input into the one-way deterministic function to generate the obfuscated filename.

3. The information handling system of claim 2, wherein the one-way deterministic function utilizes at least a cryptographic salt as another input into the one-way deterministic function to generate the obfuscated filename.

4. The information handling system of claim 1, wherein the one or more program modules are further executable by the one or more processors to generate a reverse-lookup file that associates the obfuscated filename with an original filename of the source code file or the program.

5. The information handling system of claim 1, wherein:
   the link to the debugging file in the program includes a directory pathway; and
   links for each of a plurality of debugging files, corresponding to each of the source code files, include the directory pathway.

6. The information handling system of claim 1, wherein the one-way deterministic function is a hash function.

7. The information handling system of claim 1, wherein the program is one of a plurality of programs included in an executable binary file, wherein the executable binary file includes links to a plurality of debugging files, one debugging file for each of the plurality of programs.

8. The information handling system of claim 7, wherein the executable binary file is a Basic Input/Output System (BIOS) file.

9. A method for obfuscating debugging filenames during a software build, the method comprising:
   compile a source code file or a plurality of source code files into software modules;
   pass file names of the software modules to a script;
   generate, at least in part by the script, based at least in part on a one-way deterministic function, obfuscated filenames for the filenames of the software modules;
   pass the obfuscated filenames as arguments to a linker module; and
   generate, by the linker module, a software image file wherein the software image file is a Basic Input/Output System (BIOS) file, wherein the software image file includes links to debugging files, the links including the obfuscated filename.

10. The method of claim 9, further comprising utilizing at least an original filename of the source code file or the program as an input into the one-way deterministic function to generate the obfuscated filename.

11. The method of claim 10, utilizing a cryptographic salt as another input into the one-way deterministic function to generate the obfuscated filename.

12. The method of claim 9, further comprising generating a reverse-lookup file that identifies the obfuscated filename with an original filename of the source code file or the program.

13. The method of claim 9, wherein:
   the program is one of a plurality of programs included in the BIOS file; and
   the BIOS file includes links to a plurality of debugging files, one debugging file for each of the plurality of programs.

14. One or more non-transitory computer-readable media having programming instructions that are executable by one or more processors to perform acts comprising:
- compiling a source code file or a plurality of source code files into software modules;
- passing filenames of the software modules to a script;
- generating, at least in part by the script and based at least in part on a one-way deterministic function, obfuscated filenames for the filenames of the software modules;
- passing, by the script, the obfuscated filenames as arguments to a linker module; and
- generating, by the linker module, a software image file wherein the software image file is a Basic Input/Output System (BIOS) file, the software image file including links to the debugging file in the program, the link including the obfuscated filename.

15. The one or more non-transitory computer-readable media of claim 14, wherein the acts further comprise utilizing at least an original filename of the source code file or the program as an input into the one-way deterministic function to generate the obfuscated filename.

16. The one or more non-transitory computer-readable media of claim 15, wherein the acts further comprise utilizing a cryptographic salt as another input into the one-way deterministic function to generate the obfuscated filename.

17. The one or more non-transitory computer-readable media of claim 16, wherein the one-way deterministic function is a hash function.

18. The one or more non-transitory computer-readable media of claim 14, wherein:
- the program is one of a plurality of programs included in the BIOS file; and
- the BIOS file includes links to a plurality of debugging files, one debugging file for each of the plurality of programs.

19. The one or more non-transitory computer-readable media of claim 14, wherein:
- the link to the debugging file in the program includes a directory pathway; and
- links for each of a plurality of debugging files, corresponding to each of the source code files, include the directory pathway.

20. The one or more non-transitory computer-readable media of claim 14, wherein the one-way deterministic function comprises a hash function.

* * * * *